(12) United States Patent
Ludwicki et al.

(10) Patent No.: US 7,236,845 B2
(45) Date of Patent: Jun. 26, 2007

(54) SELECTING OLED DEVICES USING FIGURE OF MERIT

(75) Inventors: John E. Ludwicki, Churchville, NY (US); Michael L. Boroson, Rochester, NY (US); Andrew D. Arnold, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 302 days.

(21) Appl. No.: 11/076,810

(22) Filed: Mar. 10, 2005

(65) Prior Publication Data

US 2006/0206224 A1 Sep. 14, 2006

(51) Int. Cl.
- *G06F 19/00* (2006.01)
- *G09G 3/32* (2006.01)
- *G09G 5/00* (2006.01)
- *H01J 1/62* (2006.01)
- *H01J 63/04* (2006.01)
- *H01L 21/66* (2006.01)
- *H01L 51/40* (2006.01)

(52) U.S. Cl. .............. 700/106; 700/104; 700/108; 700/121; 345/82; 345/91; 345/214; 313/504; 438/14; 438/99

(58) Field of Classification Search ............ 345/82–84, 345/87, 90, 91, 104, 204, 214, 690; 313/504, 313/506; 700/95, 97, 103–106, 108–110, 700/117, 121; 257/40, 642, 750, 759, E51.001, 257/E51.002, E51.018, E51.022, E51.024; 438/1, 14, 82, 99, 562, 623, 725

See application file for complete search history.

(56) References Cited

U.S. PATENT DOCUMENTS

| | | | |
|---|---|---|---|
| 4,769,292 A | 9/1988 | Tang et al. | |
| 4,885,211 A | 12/1989 | Tang et al. | |
| 5,276,380 A | 1/1994 | Tang | |
| 5,550,066 A | 8/1996 | Tang et al. | |
| 5,683,823 A | 11/1997 | Shi et al. | |
| 5,685,006 A * | 11/1997 | Shiraishi | 712/34 |
| 5,780,174 A | 7/1998 | Tokito et al. | |
| 6,281,634 B1 | 8/2001 | Yokoyama | |
| 6,406,801 B1 | 6/2002 | Tokito et al. | |
| 6,456,013 B1 | 9/2002 | Komiya | |
| 6,911,961 B2 | 6/2005 | Miller et al. | |
| 6,917,159 B2 * | 7/2005 | Tyan et al. | 313/506 |
| 7,064,483 B2 * | 6/2006 | Ottermann et al. | 313/504 |
| 7,098,887 B2 * | 8/2006 | Rezania | 345/101 |
| 7,145,296 B2 * | 12/2006 | Wang et al. | 315/360 |
| 2004/0183886 A1 * | 9/2004 | Regelsberger et al. | 347/130 |
| 2005/0225574 A1 * | 10/2005 | Brown et al. | 345/694 |
| 2006/0063281 A1 * | 3/2006 | Cok et al. | 438/14 |

FOREIGN PATENT DOCUMENTS

JP 11-288786 10/1999

* cited by examiner

*Primary Examiner*—Crystal J. Barnes
(74) *Attorney, Agent, or Firm*—Raymond L. Owens (57) ABSTRACT

A method of selecting an OLED device to be manufactured based on customer requirements, including the customer providing first and second sets of requirements, providing a plurality of OLED device constructions based on the first and second sets of requirements, device architecture options, and a database including device component performance information. The method also includes providing a number of performance parameters of each of the device constructions, determining, based upon the second set of requirements, a figure of merit term comprising two or more parameters and including the importance of those parameters, and using the figure of merit term to calculate a figure of merit for the possible OLED device constructions.

18 Claims, 5 Drawing Sheets

SELECTING OLED DEVICES USING FIGURE OF MERIT

FIELD OF THE INVENTION

The present invention relates to OLED displays and to improving the performance thereof for a given set of requirements.

BACKGROUND OF THE INVENTION

An organic light-emitting diode device, also called an OLED device, commonly includes a substrate, an anode, a hole-transporting layer made of an organic compound, an organic luminescent layer with suitable dopants, an organic electron-transporting layer, and a cathode. OLED devices are attractive because of their low driving voltage, high luminance, wide-angle viewing and capability for full-color flat emission displays. Tang et al. have described a multi-layer OLED device in their U.S. Pat. Nos. 4,769,292 and 4,885,211.

Since then, a large number of different materials and designs have been described for OLED devices. For example, an OLED device comprising a matrix of pixels can be electrically driven using either a simple passive matrix or an active matrix driving scheme. In a passive matrix, the organic EL layers are sandwiched between two sets of orthogonal electrodes arranged in rows and columns, as disclosed in commonly assigned U.S. Pat. No. 5,276,380, while in an active matrix configuration, each pixel is driven by multiple circuit elements, such as provided in U.S. Pat. Nos. 5,550,066 (commonly assigned), 6,281,634, and 6,456,013. The OLED device can comprise pixels whose components emit different color light, e.g. red, green, and blue, so as to provide a full-color device. Another scheme has been to use a white-light-emitting layer, such as described by Shi in U.S. Pat. No. 5,683,823, and to use color filters in the matrix to provide red, green, and blue pixels. A variety of such color filters exist. An OLED device can be top-emitting or bottom-emitting. Microcavity structures have been used to enhance emission at a specific wavelength. Examples of microcavity structures are shown in U.S. Pat. Nos. 6,406,801, 5,780,174, and JP 11-288786. A wide variety of emitting materials of varying properties, both singlet and triplet emitters, has been used in OLED devices. Light-emitting layers generally comprise a light-emitting dopant and a host material. The choice of host material can have an effect on the performance of the emitting layer. The presence or absence of other layers, such as hole-transporting layers, electron-transporting layers, and electron-injecting layers, can have an effect on the performance of the final OLED device, as can the choice of materials used for these layers and for the electrodes. Other factors can also play a part, such as the presence or absence of polarizing layers.

This plethora of factors in OLED device construction means that it is possible to conceive of thousands of possible device constructions for a given application. This large choice in theory provides the ability to optimize displays for many different uses, as defined by the customer, because a variety of parameters can be varied and tested in OLED device construction. However, the design, construction, and testing of such a large number of devices would require considerable time and resources, making this method impractical in reality.

There exists a need for a more efficient design selection method for OLED devices, so that the chosen OLED device design can effectively meet the customer requirements.

SUMMARY OF THE INVENTION

It is therefore an object of the present invention to provide for a more efficient design selection method for OLED devices for a perceived application with specific customer requirements.

This object is achieved by a method of selecting an OLED device to be manufactured based on customer requirements, comprising:

a) the customer providing first and second sets of requirements;

b) providing a plurality of OLED device constructions based on the first and second sets of requirements, device architecture options, and a database including device component performance information;

c) providing a number of performance parameters of each of the device constructions;

d) determining, based upon the second set of requirements, a figure of merit term including two or more parameters and including the importance of those parameters; and e) using the figure of merit term to calculate a figure of merit for the possible OLED device constructions.

ADVANTAGES

It is an advantage of this invention that an OLED device design can be readily selected for a perceived application based on a variety of parameters and customer requirements. It is a further advantage of this invention that device alternatives can be considered and compared without making every device alternative. It is a further advantage of this invention that trade-offs in device performance can be considered and the design that best meets the customer's needs can be identified.

DETAILED DESCRIPTION OF THE INVENTION

Figure 1:
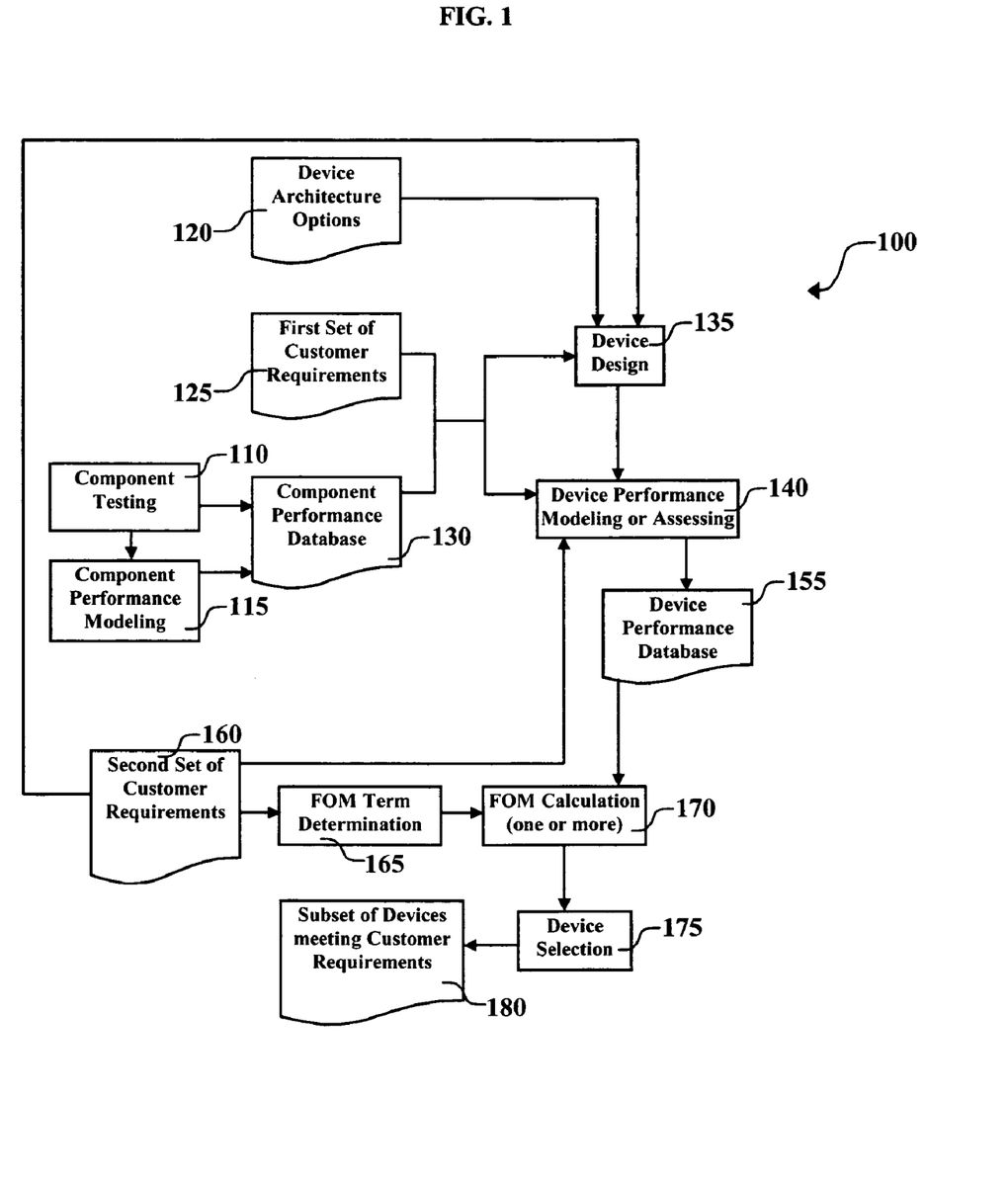
FIG. 1 is a block diagram of one embodiment of a method for selecting an OLED device design using a figure of merit according to this invention.

Turning now to FIG. 1, there is shown a block diagram of a first embodiment of a method for selecting an OLED device to be manufactured based on a variety of parameters and customer requirements by using a figure of merit according to this invention. By figure of merit, it is meant a quantity calculated from two or more parameters of an OLED device so as to compare different OLED devices and select those that best meet multiple customer-defined requirements. By parameter, it is meant a single performance measurement of a device, e.g. power consumption, device lifetime, and brightness. Parameter can also mean a business or manufacturing measurement or assessment, such as cost, yield, or manufacturability. Method 100 shows a series of steps and databases used to select an OLED device or series of devices that meet a particular set of requirements.

Initially, a customer provides a first set of requirements (database 125) and a second set of requirements (database 160) for an OLED display device. The first set of requirements can also be called application requirements and includes physical and usage specifications. Such requirements can include, but are not limited to, the desired size of the display, desired weight of the display, the resolution desired, peak luminance, white point of the display, and predicted usage information of the OLED device (including such information as typical on and off times, the types of images and/or text to be displayed, the viewing environment(s) e.g. indoor or outdoor, and the percentage of time in each viewing environment, the number and positions of viewers, and the interaction method e.g. touch screen or viewing-only screen). As will be seen, the first set of requirements is used to determine a plurality of potential OLED device constructions. The second set of requirements can also be called performance requirements, and are generally attributes that can be measured from a finished device. Such requirements can include, but are not limited to, power consumption, color gamut, contrast, display lifetime, and image quality of the OLED device.

It will be understood that the customer can actually provide a single list of requirements that will include both first and second sets of requirements. The requirements will be treated as part of the first or the second set as appropriate. It will also be understood that some requirements can be included in both the first and second set of requirements. For example, a weight requirement can be used as a guiding input in the selection of a plurality of OLED device constructions to be examined by this method, and can also be a parameter to be determined and used as part of the figure of merit to be described herein. Other parameters that can be part of either the first or second set of requirements, or both, include business or non-performance requirements, such as maximum development cost, desired time to market, manufacturability requirements (e.g. the ability to use existing production lines), yield, and desired manufacturing cost.

Method 100 also includes device architecture options database 120. Those skilled in the art will be aware of the many design options that have been described for OLED devices. Database 120 is a compilation of such options, and includes, but is not limited to:
Active or passive matrix;
Type of emission (patterned, colored emitters, or filtered white);
Colors of Pixel Components (RGB, RGBW, RGBCMY);
Construction method (shadow mask, thermal transfer);
Singlet vs. triplet emitters;
Choice of emitters;
Choice of emitter host material;
Standard or microcavity emitter construction;
Hole-transporting layer material;
Electron-transporting layer material;
Low-voltage construction;
Other organic layers;
Single- or tandem-emitter construction;
Are color filters used, and if so, which ones?;
Is a polarizer filter present, and if so, which?;
Top or bottom emitter;
Pattern of Colored Pixel Components; and
Sampling Method (fully sampled, sub-sampled).

Component performance database 130 is a database including device component performance information on components used in an OLED device (such as those described above). This information comes from several sources. One source is component testing 110. Components can be constructed and tested individually (e.g., a red emitter structure coated separately between two electrodes), or as part of a partial OLED device (e.g., the above red emitter structure with a second emitting structure between two electrodes). Any desired attribute can be tested, e.g. lifetime, color, power consumption. The component testing can be performed as new components are made.

Information in component performance database 130 can also come from component performance modeling 115. It is not necessary to test every possible combination of components to know how a component will perform. For example, the behavior of microcavity OLED devices has been well studied. If the light-emitting properties of a given emitter are known in a simple cell (the emitter structure between two electrodes), it is possible to predict how that emitter will behave in a microcavity device formed if the electrodes are at least partially reflecting. Any component performance modeling 115 done for a previous device selection process by this method can become part of component performance database 130 for all future device selection processes. Some examples of how models can be used include Kahen, *Appl. Phys. Lett.* 78, 1649 (2001); Raychaudhuri et al., *J. Soc. Inf. Display* 12, 315 (2004); and Crawford, *J. Chem. Phys.* 89, 6017 (1988).

In device design step 135, one can choose a plurality of OLED device constructions based on device architecture options 120, first set of customer requirements 125, second set of customer requirements 160, and database 130 including device component performance information. By OLED device construction, it is meant a specific set of components within a specific device architecture, whether that construction is to be modeled or actually built and tested. For example, if a customer demands a certain display resolution, the device designer can discard architectures incapable of meeting the required resolution. The device designer can also consider second set of customer requirements 160 in device design step 135. For example, if low power consumption is a customer requirement, the device designer can discard components from component performance database 130 that require excessive power consumption. The result of device design step 135 will be one or more potential OLED device constructions to be modeled in the following step. The number of OLED device constructions can be quite large and can even number in the thousands.

The OLED devices selected or designed in device design step 135 are then used in device performance modeling or assessing step 140. In device performance modeling or assessing step 140, one or more models or assessment methods are used to provide performance parameters of each of the OLED device constructions based on performance of the individual components in component performance database 130, first set of customer requirements 125, and second set of customer requirements 160. There are numerous models or assessment methods that can be used, as those skilled in the art will be aware. For example, the component performance model for calculating the emission behavior of a known emitter when used in a microcavity system (as described in the above references by Kahen and Raychaudhuri) can be incorporated into the device performance model. In this instance, the device performance model would be able to accept component performance information for a non-microcavity emitter component and use that information to calculate the performance of a device with a microcavity emitter. The parameters required from the device performance model are determined by second set of customer requirements 160. Device performance modeling or assessing 140 produces, for the potential OLED devices designed in device design 135, a series of outputs of the expected performance of each OLED device. Device performance modeling or assessing 140 can produce outputs such as brightness, power consumption, device lifetime, and device color gamut. Outputs can also include assessments, e.g. of manufacturing cost or manufacturing difficulty. The result of modeling is a device performance database 155 combining the results of the modeling in parameters of interest for all the OLED devices. These results will be used in determining the figure of merit.

The second set of customer requirements 160 is used in determining the figure of merit term (step 165). The figure of merit term is an expression including at least two parameters or functions of parameters by which a figure of merit can be calculated. In one embodiment, the figure of merit term can have the general form shown in Eq. 1:

$$S_1 f_1^{n1} + S_2 f_2^{n2} + \ldots + S_x f_x^{nx} \qquad (Eq. 1)$$

wherein:

$f_1, f_2 \ldots f_x$ are functions of one or more parameters of the second set of requirements;

$S_1, S_2 \ldots S_x$ are scaling or normalizing factors that are non-zero and can be positive or negative; and n1, n2 ... nx are weighting factors, are non-zero, and can be positive or negative and x is an integer greater than 2.

By parameter is meant some measure of device performance. Some examples of device performance parameters that can be included in the figure of merit term are device lifetime (in e.g. hours), power consumption (in e.g. watts), and color gamut (in. e.g. NTSC ratio). Parameters can also include business parameters related to the OLED device, such as manufacturing cost (in. e.g. dollars), or time of development (in. e.g. months). Parameters can be continuous (e.g. power consumption), or can have discrete values (e.g. a customer satisfaction rating of 1, 2, or 3).

By function is meant a mathematical function of one or more device parameters and provides a value that can be part of a figure of merit term. In its simplest form, the function can be the parameter itself. Some other non-limiting examples of functions that can be used in this method include:

$$f = \log P_{device}; \qquad (Eq. 2)$$

$$f = P_{device}/P_{required}; \qquad (Eq. 3)$$

$$f = P_{device} - P_{required}; \qquad (Eq. 4)$$

$$f = (P_1)^a * (P_2)^b; \qquad (Eq. 5)$$

$$f = a^P; \qquad (Eq. 6)$$

$$f = 0 \text{ if } P_{device} < P_{minimum}, 100 \text{ if } P_{device} > P_{maximum},$$
$$100(P_{device} - P_{minimum})/(P_{maximum} - P_{minimum})$$
$$\text{otherwise}; \qquad (Eq. 7)$$

$$f = 0 \text{ if } P_{device} < P_{required}, \text{ else } f = 1; \qquad (Eq. 8) \text{ and}$$

$$f = 0 \text{ if } P_{device} < P_{required}, \text{ else } (P_{device} - P_{required})^{1/2}; \qquad (Eq. 9)$$

wherein:

$P_{device}$ is a measured parameter, the identity of which is included in second set of customer requirements 160;

$P_{required}$, $P_{minimum}$, and $P_{maximum}$ are dictated by second set of customer requirements 160; and a and b are constants.

The figure of merit term can include limitations on one or more parameters, which can be set by the use of a function. Eq. 7 above is an example of this. If a customer desires a device lifetime of 5,000 hours, and would prefer 10,000 hours, but is not concerned with more than 10,000 hours, then Eq. 7 can be used wherein P is lifetime, $P_{minimum}$ is 5,000, and $P_{maximum}$ is 10,000.

The above described limitations can also include the limitation wherein one or more of the parameters in the figure of merit term should be within a predetermined range or the calculated device cannot be considered. For example, the color gamut of the complete device, or the color of one of the light-emitting pixel components, can be specified to be within a predetermined range of CIEx and CIEy coordinates. Devices or pixel components with color parameters outside of this range will not be considered, regardless of the performance of any other parameters.

One or more of the functions of parameters can comprise a go/no-go decision. Eq. 8 is an example of this. If the parameter is less than a predetermined value (e.g. 1,000 hours device lifetime), the value of zero can mean that the device in question will not be considered. Otherwise, it will be considered.

In another embodiment, the figure of merit term can have the general form shown in Eq. 10:

$$S(f_1^{n1} * f_2^{n2} * \ldots * f_y^{ny}) \qquad (Eq. 10)$$

wherein:

$f_1, f_2 \ldots f_y$ are functions of one or more parameters of the second set of requirements;

S is a scaling or normalizing factor that is non-zero and can be positive or negative; and n1, n2 ... ny are weighting factors, are non-zero, and can be positive or negative and y is an integer greater than 2.

In other embodiments, Eq. 1 and Eq. 10 can be combined to give a figure of merit term with the form of Eq. 11:

$$S_{1a} f_{1a}^{n1a} + S_{2a} f_{2a}^{n2a} + \ldots + S_{xa} f_{xa}^{nxa} + S_b (f_{1b}^{n1b} * f_{2b}^{n2b} * \ldots * f_{yb}^{nyb}) \qquad (Eq. 11)$$

or Eq. 12:

$$(S_{1a} f_{1a}^{n1a} + S_{2a} f_{2a}^{n2a} + \ldots + S_{xa} f_{xa}^{nxa}) * S_b (f_{1b}^{n1b} * f_{2b}^{n2b} * \ldots * f_{yb}^{nyb}) \qquad (Eq. 12)$$

wherein:

$f_{1a}, f_{2a} \ldots f_{xa}$ and $f_{1b} \ldots f_{yb}$ are functions of one or more parameters of the second set of requirements;

$S_{1a}, S_{2a} \ldots S_{xa}$ and $S_b$ are scaling or normalizing factors that are non-zero and can be positive or negative; and n1a, n2a ... nxa and n1b ... nyb are weighting factors, are non-zero, and can be positive or negative and x and y are integers greater than 2.

The figure of merit term that was determined in figure of merit determination step 165 is then used to calculate the figure of merit (step 170). The results of the parameters in device performance database 155 are applied to the figure of merit term, and a figure of merit is calculated for each possible OLED device construction evaluated in device performance modeling or assessing 140. Although not shown, the resulting figures of merit can be stored in an optional figure of merit database for use in the next step or for future use. One or more OLED device constructions with the best figures of merit are then selected in device selection (step 175) and included in the subset of OLED devices meeting customer requirements (database 180). A single best-fit OLED device for the customer requirements, or the entire subset of devices meeting the requirements, or a portion thereof, can be presented to the customer. Thus, the calculated figure of merit is used to provide one or more OLED device candidates to the customer. The customer can select one of the OLED device candidates to be ordered. If the customer feels that insufficient data exists, the customer can select one or more OLED devices, of the OLED device candidates, to be made and tested. Based on the results, the customer can then select the OLED device to be ordered and manufactured, and the customer then places an order.

Figure 2:
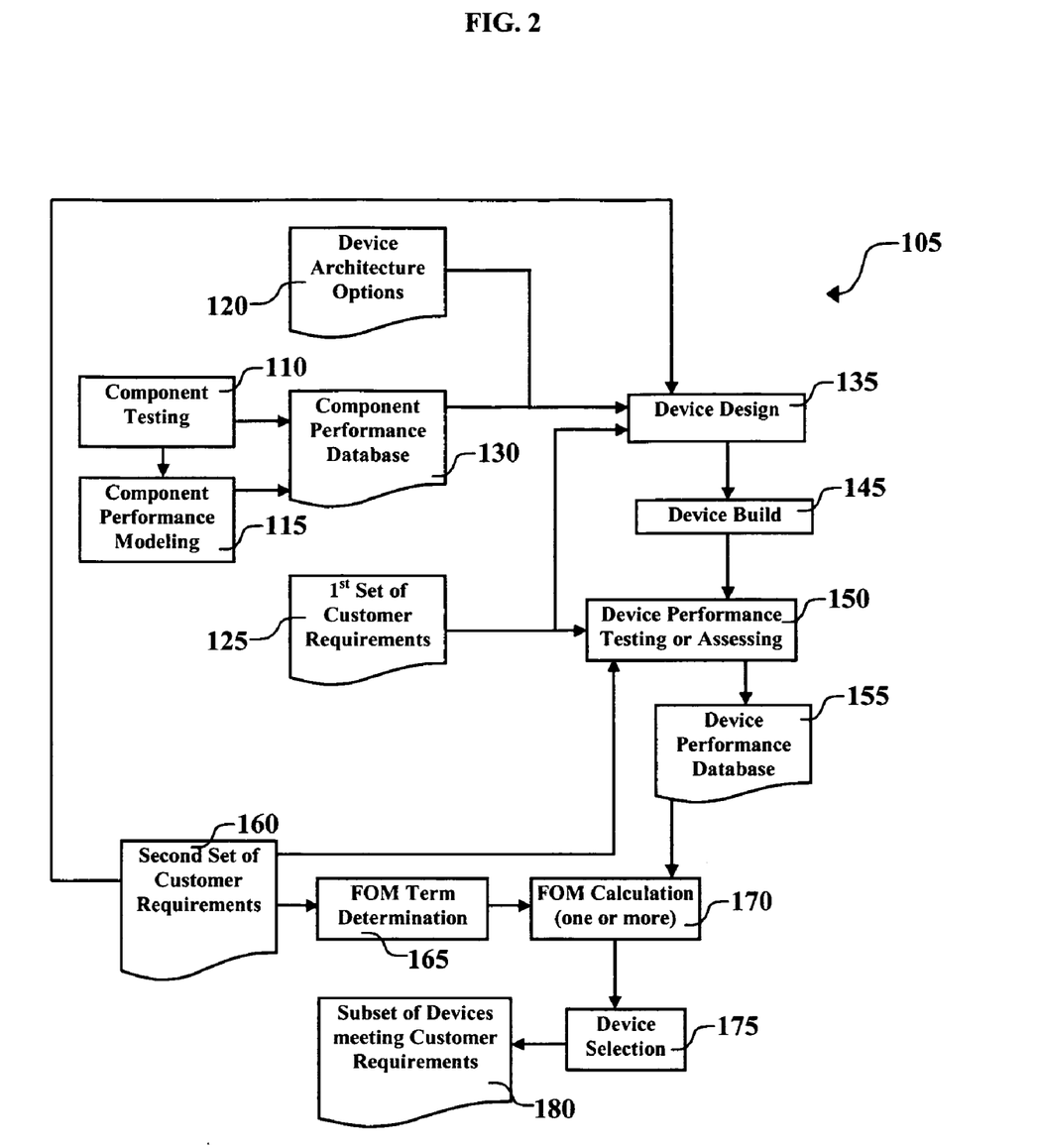
FIG. 2 is a block diagram of another embodiment of a method for selecting an OLED device design using a figure of merit according to this invention.

Turning now to FIG. 2, there is shown a block diagram of another embodiment of a method for selecting an OLED device to be manufactured based on customer requirements by using a figure of merit according to this invention. All or part of the device performance database 155 is obtained by building and testing or assessing one or more OLED devices. In method 105, databases 120, 125, and 130 and steps 110 and 115 are the same as in method 100 above. In device design step 135, one can choose from device architecture options 120 to design one or more OLED devices to be constructed. One will be guided by first set of customer requirements 125, by component performance database 130, and by second set of customer requirements 160 in device design step 135. The result of device design step 135 will be one or more potential OLED device constructions to be constructed in device build step 145 by methods familiar to those skilled in the art. Any devices constructed will then be tested or assessed in device performance testing or assessing step 150. Device performance testing or assessing 150 includes at least tests to meet customer requirements as defined by second set of customer requirements 160, and the testing will be guided by usage information in the first set of customer requirements 125. Device performance testing or assessing 150 can include as outputs performance parameters such as brightness, power consumption, device lifetime, and device color gamut. Output parameters can also include assessments, e.g. of manufacturing cost or manufacturing difficulty. The result of testing is a device performance database 155 combining the results of the modeling in parameters of interest for all the OLED devices. These results will be used in determining the figure of merit as described for method 100 above.

In some cases it can be useful to combine the above two methods. That is, a large number of OLED device constructions can be modeled in device performance modeling 140 of method 100, while a much smaller number of device constructions can be built in device building 145 and tested in device performance testing or assessing 150 of method 105. Device performance building and testing can be done as a check of the accuracy of the modeling process, or to fill in results for devices for which no accurate models exist, or both. The modeling and testing results can be combined in a single device performance database 155 that can then be used to determine a figure of merit as already described.

Figure 3:
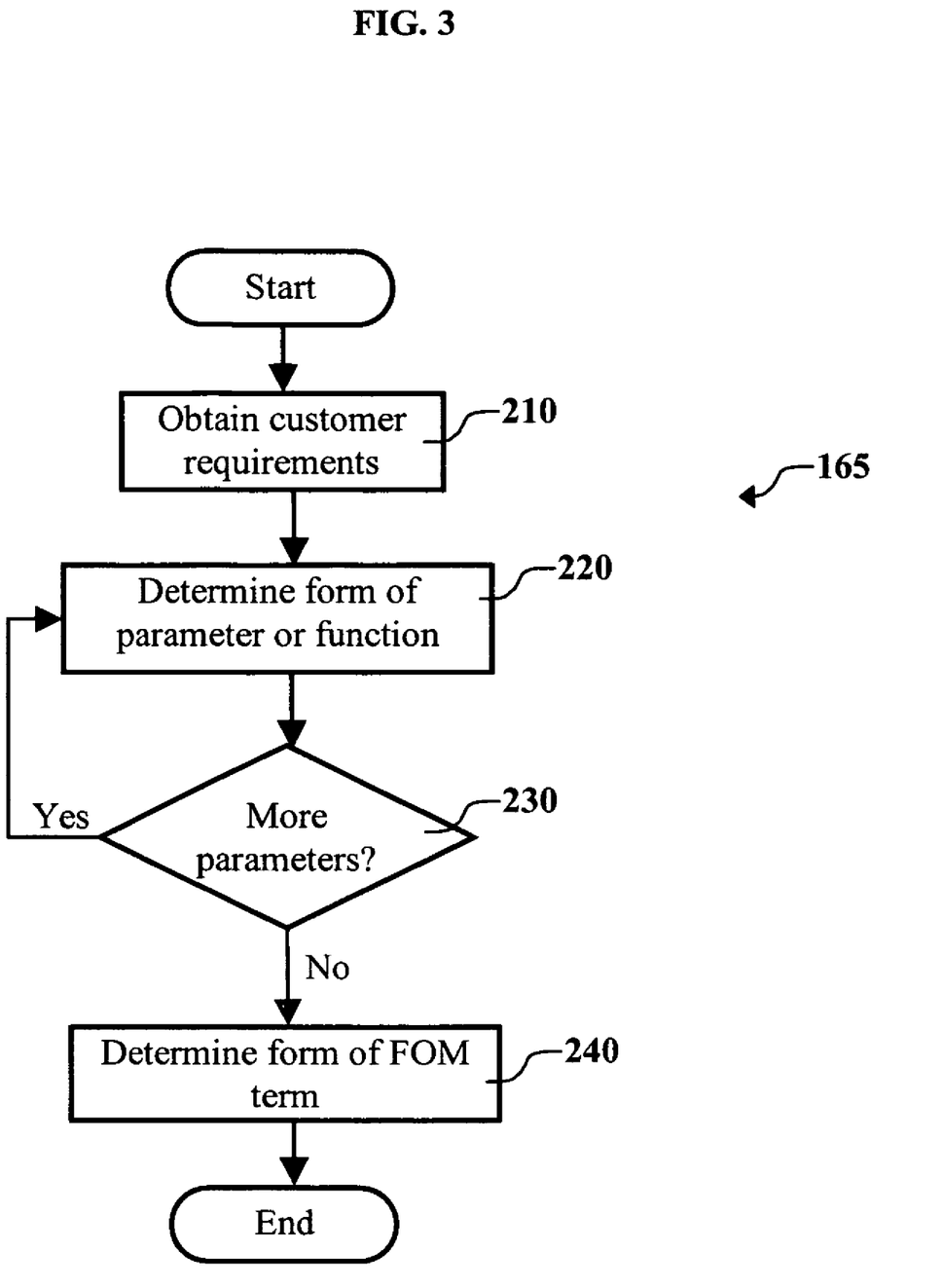
FIG. 3 is a block diagram of one method of determining the structure of the figure of merit term.

Turning now to FIG. 3, and referring also to FIG. 1 and FIG. 2, there is shown a block diagram of one method of determining the structure of the figure of merit term. At the start, second set of customer requirements 160 is obtained (step 210). Second set of customer requirements 160 includes what parameters the customer has indicated are important, the required and desired values of these parameters if applicable, and the relative importance of the parameters. The term "importance" refers to the relative value of a parameter of the second set of requirements in determining the best device for the customer. In general, the importance of the parameters will be defined by the customer and should be taken into account in determining the form of the figure of merit term, as described below.

The form of the function of the parameter is then determined for the first parameter (step 220). Second set of customer requirements 160 is used as a guide to the form of the function. If the parameter is such that a higher result is better (e.g. device lifetime), a function can be used where a more positive parameter means a more positive function result. Thus, the function can be the parameter itself, or can be a function such as those of Eq. 2, Eq. 3, or Eq. 6, above. If a customer-required parameter has the nature where a smaller value is better (e.g. power consumption), the function can be, e.g., the inverse of the parameter. If the customer has imposed limits on the value of the parameter, one can use a function like Eq. 7 or Eq. 8, or another function with limits.

If there are more parameters for which the form of the function is to be determined (step 230), then step 220 is repeated. If the forms of functions have been determined for each of the customer-required parameters, the form of the figure of merit term is determined (step 240). Part of this was done in determining the forms of the functions of the parameters. In determining the form of the figure of merit term, the relative importance of the parameters should be taken into account, which can be accomplished by including weightings of one or more of the parameters in the figure of merit term so that the parameters with greater importance exert greater influence on the value of the figure of merit. For example, if the customer is interested in device lifetime, power consumption, and emission color, and states that emission color is more important than the other parameters, one can use a form of Eq. 1 or Eq. 10 where the weighting factor (that is, the $n_x$ term) for the color function is 2 or greater, but is 1 for the functions of the other parameters. It can also be necessary to include normalizing factors (that is, the $S_x$ terms in Eq. 1). For example, if a figure of merit term such as Eq. 1 includes lifetime (on the order of 1,000's of hours) and unit manufacturing cost (on the order of 10's of dollars), it is necessary to normalize the functions so that both parameters have approximately equal influence on the figure of merit. A normalizing factor for each function is not necessary if the figure of merit term is calculated by multiplication, as in Eq. 10.

Figure of merit terms of the structure of Eq. 10 can be preferred when certain values of a single parameter can cause the device to not be considered, regardless of the values of the other parameters. In such a case, a value of zero for any one parameter will cause the figure of merit to have the value of zero, limiting it from consideration. The multiplicative parameters of Eq. 12 will also behave this way.

Figure 4:
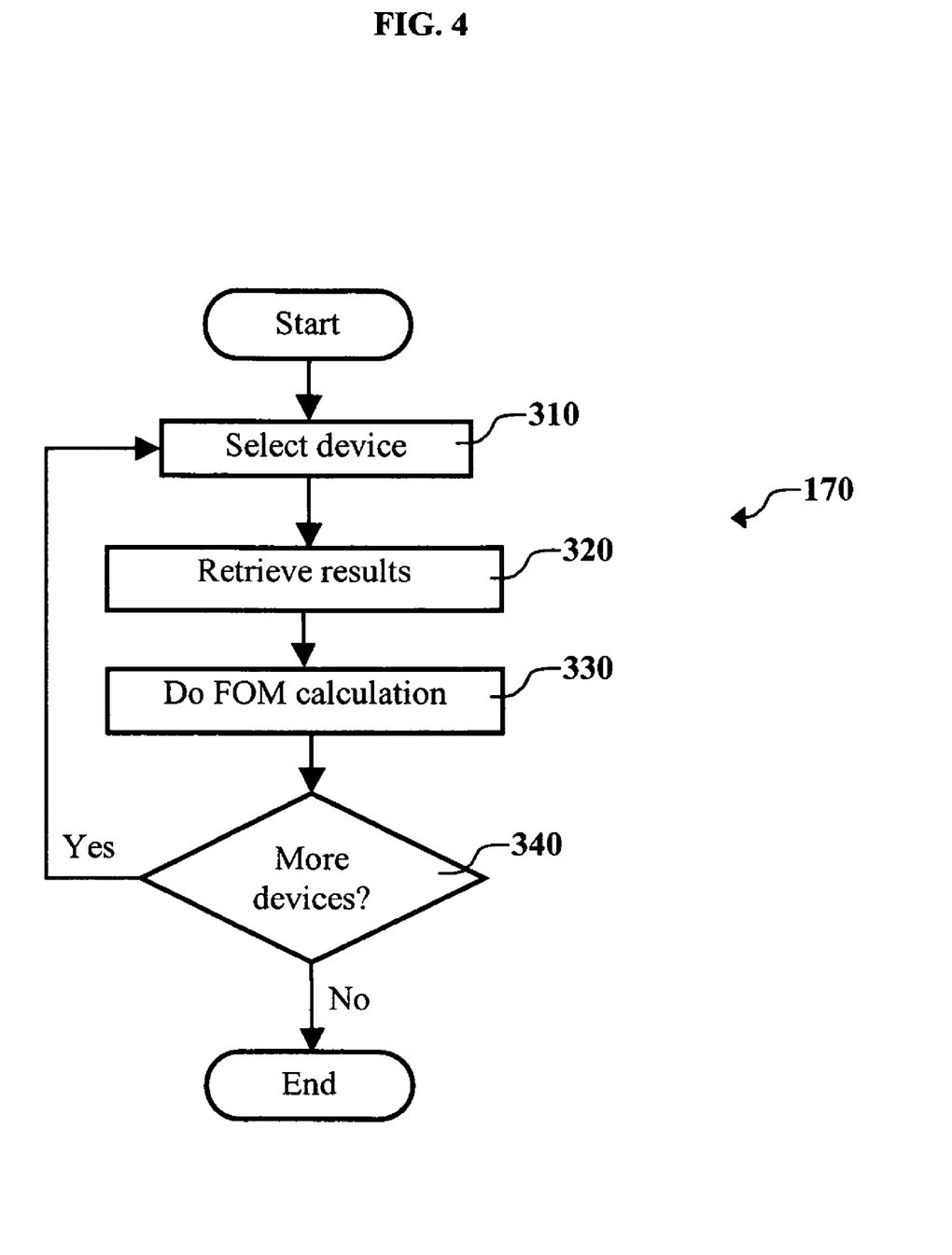
FIG. 4 is a block diagram of one method of performing a series of figure of merit calculations.

Turning now to FIG. 4, and referring also to FIG. 1 and FIG. 2, there is shown a block diagram of one method of performing a series of figure of merit calculations. At the start, one of the OLED devices is selected (step 310). The results of parameter modeling and/or testing are retrieved (step 320) for that OLED device from device performance database 155 and are then used in the figure of merit term, either directly or after being converted into a function as described above, to perform the figure of merit calculation (step 330). If there are more devices for which to determine the figure of merit (step 340), the process is repeated from step 310. If there are no more devices for which to determine the figure of merit, the process ends.

Figure 5:
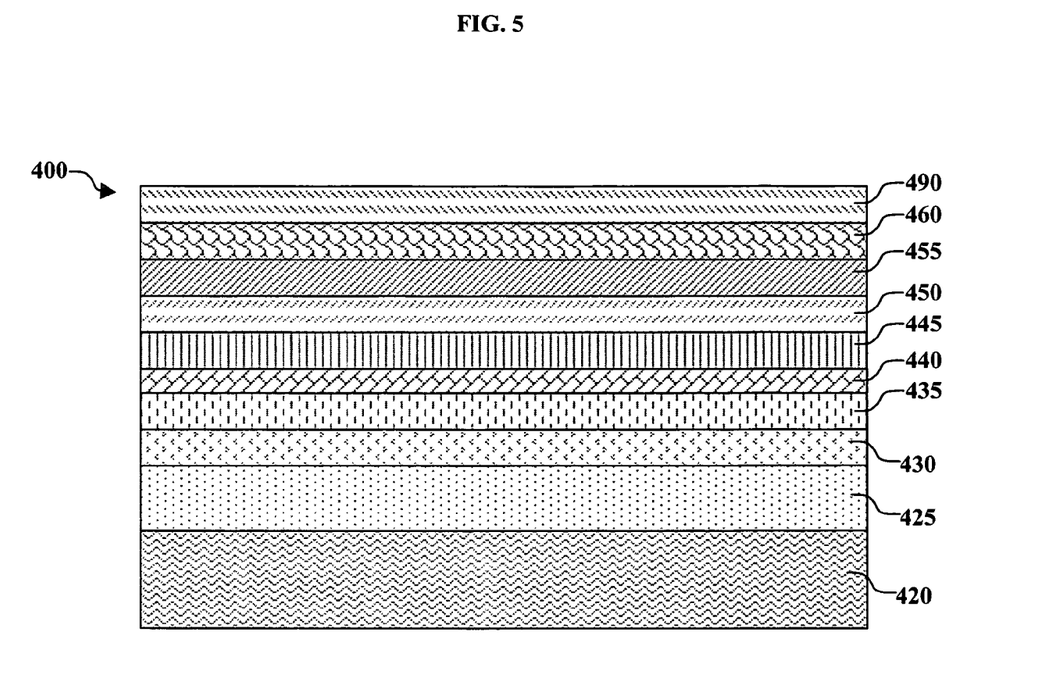
FIG. 5 is a cross-sectional view of one embodiment of an OLED device that can be selected by the method according to this invention.

The nature of this method is such that it can be used with many different kinds of OLED device structures. Turning now to FIG. 5, there is shown a cross-sectional view of one embodiment of an OLED device out of many that can be selected by the method according to this invention. OLED device 400 can be a broadband-emitting OLED device, a white-light-emitting OLED device, a single-color-emitting OLED device, or a single pixel of a multicolor OLED device. It includes, at a minimum, a substrate 420, an anode 430, cathode 490 spaced from anode 430, and a light-emitting layer 450. OLED device 400 can also include a color filter element 425, a hole-injecting layer 440, a hole-transporting layer 445, an electron-transporting layer 455, an electron-injecting layer 460, a microcavity spacer layer 435, and other light-emitting layers.

Substrate 420 can be an organic solid, an inorganic solid, or include organic and inorganic solids. Substrate 420 can be rigid or flexible and can be processed as separate individual pieces, such as sheets or wafers, or as a continuous roll. Typical substrate materials include glass, plastic, metal, ceramic, semiconductor, metal oxide, semiconductor oxide, or semiconductor nitride, or combinations thereof. Substrate 420 can be a homogeneous mixture of materials, a composite of materials, or multiple layers of materials. Substrate 420 can be an OLED substrate, that is a substrate commonly used for preparing OLED devices, e.g. active matrix low temperature polysilicon or amorphous-silicon TFT substrate. The substrate 420 can be light transmissive, light absorbing or light reflective. Substrate materials include, but are not limited to, glass, plastic, semiconductor materials, ceramics, and circuit board materials, or any others commonly used in the formation of OLED devices, which can be either passive-matrix devices or active matrix devices.

An anode 430 is formed over substrate 420. As EL emission is viewed through the top electrode, the transmissive characteristics of the anode material are immaterial and any conductive material can be used, transparent, opaque or reflective. Example conductors for this application include, but are not limited to, gold, iridium, molybdenum, palladium, and platinum. Further examples of anode materials useful in this invention are indium-tin oxide and tin oxide, but other metal oxides can work including, but not limited to, aluminum- or indium-doped zinc oxide, magnesium-indium oxide, and nickel-tungsten oxide. In addition to these oxides, metal nitrides such as gallium nitride, metal selenides such as zinc selenide, and metal sulfides such as zinc sulfide, can be used as an anode material. In some cases a reflective anode is preferred, e.g. in a microcavity structure. The preferred anode materials have a work function of 4.1 eV or greater. Desired anode materials can be deposited by any suitable way such as evaporation, sputtering, chemical vapor deposition, or electrochemical means. Anode materials can be patterned using well known photolithographic processes.

While not always necessary, it is often useful to provide a hole-injecting layer 440. Hole-injecting layer 440 can serve to improve the film formation property of subsequent organic layers and to facilitate hole injection into hole-transporting layer 445. Suitable materials for use in hole-injecting layer 440 include, but are not limited to, porphyrinic compounds as described in U.S. Pat. No. 4,720,432, plasma-deposited fluorocarbon polymers as described in U.S. Pat. Nos. 6,127,004, 6,208,075 and 6,208,077, and some aromatic amines, for example, m-MTDATA (4,4',4"-tris[(3-methylphenyl)phenylamino]triphenylamine). Alternative hole-injecting materials for organic EL devices are described in EP 0 891 121 A1 and EP 1 029 909 A1.

Hole-transporting layer 445 contains at least one hole-transporting compound such as an aromatic tertiary amine, where the latter is understood to be a compound containing at least one trivalent nitrogen atom that is bonded only to carbon atoms, at least one of which is a member of an aromatic ring. In one form the aromatic tertiary amine can be an arylamine, such as a monoarylamine, diarylamine, triarylamine, or a polymeric arylamine. Exemplary monomeric triarylamines are illustrated by Klupfel et al. U.S. Pat. No. 3,180,730. Other suitable triarylamines substituted with one or more vinyl radicals and/or comprising at least one active-hydrogen-containing group are disclosed by Brantley et al. U.S. Pat. Nos. 3,567,450 and 3,658,520.

A more preferred class of aromatic tertiary amines are those which include at least two aromatic tertiary amine moieties as described in U.S. Pat. Nos. 4,720,432 and 5,061,569. Hole-transporting layer 445 can be formed of a single or a mixture of aromatic tertiary amine compounds. Illustrative of useful aromatic tertiary amines are the following:

1,1-Bis(4-di-p-tolylaminophenyl)cyclohexane;
1,1-Bis(4-di-p-tolylaminophenyl)-4-phenylcyclohexane;
4,4'-Bis(diphenylamino)quadriphenyl;
Bis(4-dimethylamino-2-methylphenyl)-phenylmethane;
N,N,N-Tri(p-tolyl)amine;
4-(di-p-tolylamino)-4'-[4(di-p-tolylamino)-styryl]stilbene;
N,N,N',N'-Tetra-p-tolyl-4-4'-diaminobiphenyl;
N,N,N',N'-Tetraphenyl-4,4'-diaminobiphenyl;
N,N,N',N'-tetra-1-naphthyl-4,4'-diaminobiphenyl;
N,N,N',N'-tetra-2-naphthyl-4,4'-diaminobiphenyl;
N-Phenylcarbazole;
4,4'-Bis[N-(1-naphthyl)-N-phenylamino]biphenyl;
4,4'-Bis[N-(1-naphthyl)-N-(2-naphthyl)amino]biphenyl;
4,4"-Bis[N-(1-naphthyl)-N-phenylamino]p-terphenyl;
4,4'-Bis[N-(2-naphthyl)-N-phenylamino]biphenyl;
4,4'-Bis[N-(3-acenaphthenyl)-N-phenylamino]biphenyl;
1,5-Bis[N-(1-naphthyl)-N-phenylamino]naphthalene;
4,4'-Bis[N-(9-anthryl)-N-phenylamino]biphenyl;
4,4"-Bis[N-(1-anthryl)-N-phenylamino]-p-terphenyl;
4,4'-Bis[N-(2-phenanthryl)-N-phenylamino]biphenyl;
4,4'-Bis[N-(8-fluoranthenyl)-N-phenylamino]biphenyl;
4,4'-Bis[N-(2-pyrenyl)-N-phenylamino]biphenyl;
4,4'-Bis[N-(2-naphthacenyl)-N-phenylamino]biphenyl;
4,4'-Bis[N-(2-perylenyl)-N-phenylamino]biphenyl;
4,4'-Bis[N-(1-coronenyl)-N-phenylamino]biphenyl;
2,6-Bis(di-p-tolylamino)naphthalene;
2,6-Bis[di-(1-naphthyl)amino]naphthalene;
2,6-Bis[N-(1-naphthyl)-N-(2-naphthyl)amino]naphthalene;
N,N,N',N'-Tetra(2-naphthyl)-4,4"-diamino-p-terphenyl;
4,4'-Bis{N-phenyl-N-[4-(1-naphthyl)-phenyl]amino}biphenyl;
4,4'-Bis[N-phenyl-N-(2-pyrenyl)amino]biphenyl;
2,6-Bis[N,N-di(2-naphthyl)amine]fluorene;
1,5-Bis[N-(1-naphthyl)-N-phenylamino]naphthalene; and
4,4',4"-tris[(3-methylphenyl)phenylamino]triphenylamine.

Another class of useful hole-transporting materials includes polycyclic aromatic compounds as described in EP 1 009 041. Tertiary aromatic amines with more than two amine groups can be used including oligomeric materials. In addition, polymeric hole-transporting materials can be used such as poly(N-vinylcarbazole) (PVK), polythiophenes, polypyrrole, polyaniline, and copolymers such as poly(3,4-ethylenedioxythiophene)/poly(4-styrenesulfonate) also called PEDOT/PSS.

As more fully described in U.S. Pat. Nos. 4,769,292 and 5,935,721, light-emitting layer 450 includes a luminescent or fluorescent material where electroluminescence is produced as a result of electron-hole pair recombination in this region, producing light. Light-emitting layer 450 can be comprised of a single material, but more commonly includes a host material doped with a guest compound or compounds where light emission comes primarily from the dopant and can be of any color. The host materials in light-emitting layer 450 can be an electron-transporting material, as defined below, a hole-transporting material, as defined above, or another material or combination of materials that support hole-electron recombination. The dopant is typically chosen from highly fluorescent dyes, but phosphorescent compounds, e.g., transition metal complexes as described in WO 98/55561, WO 00/18851, WO 00/57676, and WO 00/70655 are also useful. Dopants are typically coated as 0.01 to 10% by weight into the host material. Polymeric materials such as polyfluorenes and polyvinylarylenes, e.g., poly(p-phenylenevinylene), PPV, can also be used as the host material. In this case, small molecule dopants can be molecularly dispersed into the polymeric host, or the dopant can be added by copolymerizing a minor constituent into the host polymer.

An important relationship for choosing a dye as a dopant is a comparison of the bandgap potential, which is defined as the energy difference between the highest occupied molecular orbital and the lowest unoccupied molecular orbital of the molecule. For efficient energy transfer from the host to the dopant molecule, a necessary condition is that the bandgap of the dopant is smaller than that of the host material. For phosphorescent emitters it is also important that the host triplet energy level be high enough to enable energy transfer from host to dopant.

Host and emitting molecules known to be of use include, but are not limited to, those disclosed in U.S. Pat. Nos. 4,768,292, 5,141,671, 5,150,006, 5,151,629, 5,405,709, 5,484,922, 5,593,788, 5,645,948, 5,683,823, 5,755,999, 5,928,802, 5,935,720, 5,935,721, and 6,020,078.

Metal complexes of 8-hydroxyquinoline (oxine) and similar derivatives constitute one class of useful host compounds capable of supporting electroluminescence. Illustrative of useful chelated oxinoid compounds are the following:

CO-1: Aluminum trisoxine [alias, tris(8-quinolinolato)aluminum(III)];
CO-2: Magnesium bisoxine [alias, bis(8-quinolinolato)magnesium(II)];
CO-3: Bis[benzo {f}-8-quinolinolato]zinc (II);
CO-4: Bis(2-methyl-8-quinolinolato)aluminum(III)-μ-oxo-bis(2-methyl-8-quinolinolato) aluminum(III);
CO-5: Indium trisoxine [alias, tris(8-quinolinolato)indium];
CO-6: Aluminum tris(5-methyloxine) [alias, tris(5-methyl-8-quinolinolato) aluminum(III)];
CO-7: Lithium oxine [alias, (8-quinolinolato)lithium(I)];
CO-8: Gallium oxine [alias, tris(8-quinolinolato)gallium (III)]; and
CO-9: Zirconium oxine [alias, tetra(8-quinolinolato)zirconium(IV)].

Other classes of useful host materials include, but are not limited to: derivatives of anthracene, such as 9,10-di-(2-naphthyl)anthracene and derivatives thereof as described in U.S. Pat. No. 5,935,721, distyrylarylene derivatives as described in U.S. Pat. No. 5,121,029, and benzazole derivatives, for example, 2,2',2"-(1,3,5-phenylene)tris[1-phenyl-1H-benzimidazole]. Carbazole derivatives are particularly useful hosts for phosphorescent emitters.

Useful fluorescent dopants include, but are not limited to, derivatives of anthracene, tetracene, xanthene, perylene, rubrene, coumarin, rhodamine, quinacridone, dicyanomethylenepyran compounds, thiopyran compounds, polymethine compounds, pyrilium and thiapyrilium compounds, fluorene derivatives, periflanthene derivatives, indenoperylene derivatives, bis(azinyl)amine boron compounds, bis(azinyl) methane compounds, and carbostyryl compounds.

Preferred thin film-forming materials for use in forming electron-transporting layer 455 are metal chelated oxinoid compounds, including chelates of oxine itself (also commonly referred to as 8-quinolinol or 8-hydroxyquinoline). Such compounds help to inject and transport electrons, exhibit high levels of performance, and are readily fabricated in the form of thin films. Exemplary oxinoid compounds were listed previously.

Other electron-transporting materials include various butadiene derivatives as disclosed in U.S. Pat. No. 4,356,429 and various heterocyclic optical brighteners as described in U.S. Pat. No. 4,539,507. Benzazoles and triazines are also useful electron-transporting materials.

In some instances, light-emitting layer 450 and electron-transporting layer 455 can optionally be replaced by a single layer that serves the function of supporting both light emission and electron transportation. It is also known in the art that emitting dopants can be added to the hole-transporting layer 445, which can serve as a host. Additional light-emitting layers can be included. Multiple dopants can be added to one or more layers to emit complementary or nearly complementary colors in order to produce a white-emitting OLED, for example, by combining blue- and yellow-emitting materials, cyan- and red-emitting materials, or red-, green-, and blue-emitting materials. White-emitting devices are described, for example, in EP 1 187 235, EP 1 182 244, U.S. Patent Application Publication 2002/0025419 A1; U.S. Pat. Nos. 5,683,823, 5,503,910, 5,405,709, and 5,283,182. As shown in commonly assigned EP 1 187 235, a white emitting organic EL media can be achieved by the inclusion of the following layers: a hole-injecting layer 440; a hole-transporting layer 445 that is disposed over hole-injecting layer 440 and is doped with a rubrene compound for emitting light in the yellow region of the spectrum; a light-emitting layer 450 doped with a blue-light-emitting compound disposed over hole-transporting layer 445; and an electron-transporting layer 455 disposed over light-emitting layer 450. Alternate embodiments where one or more different materials are used in the organic layers for different pixels can also be applied to the present invention.

An electron-injecting layer 460 can also be present between the cathode and the electron-transporting layer. Examples of electron-injecting materials include alkaline or alkaline earth metals, alkali halide salts, such as LiF mentioned above, or alkaline or alkaline earth metal doped organic layers.

Additional layers such as electron- or hole-blocking layers as taught in the art can be employed in devices of this invention. Hole-blocking layers are commonly used to improve efficiency of phosphorescent emitter devices, for example, as in U.S. Patent Application Publication 2002/0015859 A1.

The organic materials above are suitably deposited through a vapor-phase method such as sublimation, but can be deposited from a fluid, for example, from a solvent with an optional binder to improve film formation. If the material is a polymer, solvent deposition is useful but other methods can be used, such as sputtering or thermal transfer from a donor sheet. The material to be deposited by sublimation can be vaporized from a sublimator "boat" often comprised of a tantalum material, e.g., as described in U.S. Pat. No. 6,237,529, or can be first coated onto a donor sheet and then sublimed in closer proximity to the substrate. Layers with a mixture of materials can use separate sublimator boats or the materials can be premixed and coated from a single boat or donor sheet. Patterned deposition can be achieved using shadow masks, integral shadow masks (U.S. Pat. No. 5,294,870), spatially-defined thermal dye transfer from a donor sheet (U.S. Pat. Nos. 5,688,551, 5,851,709, and 6,066,357), and inkjet method (U.S. Pat. No. 6,066,357).

Most OLED devices are sensitive to moisture or oxygen, or both, so they are commonly sealed in an inert atmosphere such as nitrogen or argon, along with a desiccant such as alumina, bauxite, calcium sulfate, clays, silica gel, zeolites, alkaline metal oxides, alkaline earth metal oxides, sulfates, or metal halides and perchlorates. Methods for encapsulation and desiccation include, but are not limited to, those described in U.S. Pat. Nos. 6,226,890 and 6,656,609.

OLED devices of this invention can employ various well known optical effects in order to enhance its properties if desired. This includes, but is not limited to, optimizing layer thicknesses to yield maximum light transmission, providing dielectric mirror structures, replacing reflective electrodes with light-absorbing electrodes, providing anti-glare or anti-reflection coatings over the display, providing a polarizing medium over the display, or providing colored, neutral density, or color conversion filters over the display.

OLED device 400 can comprise a microcavity structure with inclusion of a reflector and a semitransparent reflector, which can be anode 430 and cathode 490, or the reflector or semitransparent reflector, or both, can be separate structures. The reflector and semitransparent reflector function, with the layers between them, to form a microcavity, which can be adjusted in thickness and refractive index to resonate at a desired wavelength. Examples of microcavity structures are shown in U.S. Pat. Nos. 6,406,801 and 5,780,174, and JP 11-288786. A microcavity OLED device can include a transparent microcavity spacer layer 435 to help adjust the thickness of the microcavity.

The invention has been described in detail with particular reference to certain preferred embodiments thereof, but it will be understood that variations and modifications can be effected within the spirit and scope of the invention.

PARTS LIST

100 method
105 method
110 block
115 block
120 database
125 database
130 database
135 block
140 block
145 block
150 block
155 database
160 database
165 block
170 block
175 block
180 database
210 block
220 block
230 decision block
240 block
310 block
320 block
330 block
340 decision block
400 OLED device
420 substrate
425 color filter element
430 anode
435 microcavity spacer layer
440 hole-injecting layer
445 hole-transporting layer
450 light-emitting layer
455 electron-transporting layer
460 electron-injecting layer
490 cathode

The invention claimed is:

1. A method of selecting an OLED device to be manufactured based on customer requirements, comprising:
    a) the customer providing first and second sets of requirements;
    b) providing a plurality of OLED device constructions based on the first and second sets of requirements, device architecture options, and a database including device component performance information;
    c) providing a number of performance parameters of each of the device constructions;
    d) determining, based upon the second set of requirements, a figure of merit term including two or more parameters and including the importance of those parameters; and
    e) using the figure of merit term to calculate a figure of merit for the possible OLED device constructions.

2. The method according to claim 1 wherein the first set of requirements includes active area size, resolution, peak luminance, and white point of the OLED device.

3. The method according to claim 2 wherein the first set of requirements includes usage information of the OLED device.

4. The method according to claim 3 wherein the first set of requirements further includes maximum development cost, desired time to market, manufacturability requirements, or desired manufactured cost.

5. The method according to claim 1 wherein the second set of requirements includes lifetime, power consumption, or color gamut of the OLED device.

6. The method according to claim 5 wherein the second set of requirements further includes maximum development cost, desired time to market, manufacturability requirements, or desired manufactured cost.

7. The method according to claim 1 further including using the calculated figure of merit to provide one or more OLED device candidates to the customer and the customer selecting one or more OLED devices to be made and tested.

8. The method according to claim 7 wherein the customer selects the OLED device to be ordered from the OLED devices made and tested, and places an order.

9. The method according to claim 1 wherein the figure of merit term includes one or more parameters selected from power consumption, device lifetime, and color gamut, or functions thereof.

10. The method according to claim 1 wherein the figure of merit term includes limitations on one or more of the parameters.

11. The method according to claim 10 wherein the figure of merit term includes one or more parameters selected from power consumption, device lifetime, and color gamut, or functions thereof.

12. The method according to claim 1 wherein the figure of merit term includes weightings of one or more of the parameters.

13. The method according to claim 1 wherein at least one of the parameters in the figure of merit term should be within a predetermined range or the calculated device can not be considered.

14. The method according to claim 1 wherein the figure of merit term has the form $$S_1 f_1^{n1} + S_2 f_2^{n2} + \ldots + S_x f_x^{nx}$$

wherein:
- $f_1, f_2 \ldots f_x$ are functions of one or more parameters of the second set of requirements;
- $S_1, S_2 \ldots S_x$ are scaling or normalizing factors that are non-zero and can be positive or negative; and
- n1, n2 . . . nx are weighting factors, are non-zero, and can be positive or negative and x is an integer greater than 2.

15. The method according to claim 1 wherein the figure of merit term has the form $$S(f_1^{n1} * f_2^{n2} * \ldots * f_y^{ny})$$

wherein:
- $f_1, f_2 \ldots f_y$ are functions of one or more parameters of the second set of requirements;
- S is a scaling or normalizing factor that is non-zero and can be positive or negative; and
- n1, n2 . . . ny are weighting factors, are non-zero, and can be positive or negative and y is an integer greater than 2.

16. The method according to claim 1 wherein the figure of merit term has the form:

$$S_{1a} f_{1a}^{n1a} + S_{2a} f_{2a}^{n2a} + \ldots + S_{xa} f_{xa}^{nxa} + S_b (f_{1b}^{n1b} * f_{2b}^{n2b} * \ldots * f_{yb}^{nyb})$$

wherein:
- $f_{1a}, f_{2a} \ldots f_{xa}$ and $f_{1b} \ldots f_{yb}$ are functions of one or more parameters of the second set of requirements;
- $S_{1a}, S_{2a} \ldots S_{xa}$ and $S_b$ are scaling or normalizing factors that are non-zero and can be positive or negative; and
- n1a, n2a . . . nxa and n1b . . . nyb are weighting factors, are non-zero, and can be positive or negative and x and y are integers greater than 2.

17. The method according to claim 1 wherein the figure of merit term has the form $$\frac{(S_{1a} f_{1a}^{n1a} + S_{2a} f_{2a}^{n2a} + \ldots + S_{xa} f_{xa}^{nxa})*}{S_b (f_{1b}^{n1b} * f_{2b}^{n2b} * \ldots * f_{yb}^{nyb})}$$

wherein:
- $f_{1a}, f_{2a} \ldots f_{xa}$ and $f_{1b} \ldots f_{yb}$ are functions of one or more parameters of the second set of requirements;
- $S_{1a}, S_{2a} \ldots S_{xa}$ and $S_b$ are scaling or normalizing factors that are non-zero and can be positive or negative; and
- n1a, n2a . . . nxa and n1b . . . nyb are weighting factors, are non-zero, and can be positive or negative and x and y are integers greater than 2.

18. The method according to claim 1 wherein the database including device component performance information is obtained by building and testing one or more OLED devices.

* * * * *